United States Patent Office 3,535,379
Patented Oct. 20, 1970

3,535,379
AMMONOLYSIS OF CYCLOHEXANOL OR CYCLOHEXANONE IN THE PRESENCE OF A NICKEL OXIDE, CHROMIUM SESQUIOXIDE CATALYST SYSTEM
Paul Besson, Pierre Thirion, and Denise Wohlschlegel, La Chambre, France, assignors to Ugine Kuhlmann, Paris, France, a French company
No Drawing. Filed Apr. 20, 1967, Ser. No. 632,182
Claims priority, application France, Apr. 22, 1966, 58,638
Int. Cl. C07c *85/06, 85/08*
U.S. Cl. 260—563                            17 Claims

ABSTRACT OF THE DISCLOSURE

Cyclohexylamine and dicyclohexylamine are prepared by catalytic reduction of cyclohexanol or cyclohexanone or a mixture of both with hydrogen and ammonia. The suitable catalyst consists essentially of nickel oxide and chromium sesquioxide with an inert support of diatomaceous earth, kaolin and sodium carbonate. The catalyst is pretreated with hydrogen prior to its use for the catalytic reduction of cyclohexanol or cyclohexanone.

BACKGROUND OF THE INVENTION

Field of the invention

This invention relates to the production of cyclohexylamine and dicyclohexylamine by catalytic reduction of cyclohexanol and cyclohexanone in a gaseous state.

Description of the prior art

It is known that various primary or secondary open chain alcohols containing 2 to 10 carbon atoms may be reduced to the corresponding amines by hydrogenation in the gaseous state with ammonia and in the presence of a catalyst which is commonly a nickel base compound pretreated by a reduction process. It is also known that the open chain aliphatic aldehydes and ketones corresponding to the alcohols mentioned hereinabove, can also be converted to the corresponding amine by reduction with ammonia and hydrogen in a vapor phase and in the presence of a catalyst which generally is also a nickel compound pretreated by a reduction process.

Until recently these methods for preparing cyclohexylamine have received relatively little attention. Cyclohexanol and cyclohexanone which are prepared commercially from phenol have been relatively expensive products and hence have not been used as starting raw materials for the production of cyclohexylamine, instead aniline was used in the commercial production of cyclohexylamine by catalytic hydrogenation.

Recent advancement in the chemistry of cyclohexylamine derivatives combined with the activity in the chemistry of cyclohexane have revived interest in the problems related to the manufacture of cyclohexylamine from cyclohexanol, cyclohexanone and mixtures thereof. The demand for superpolyamides has further led to the use of various techniques such as catalytic oxidation of cyclohexane to produce cyclohexanol or cyclohexanone to replace the prior method by the hydrogenation of phenol. The new techniques used render the preparation of cyclohexylamine from cyclohexanol and cyclohexanone economically more feasible.

SUMMARY OF THE INVENTION

The present invention provides a novel method for producing cyclohexylamine and dicyclohexylamine. The method comprises reducing in a gaseous state cyclohexanol, cyclohexanone or a mixture of both with hydrogen and ammonia at a temperature in the range between 100° and 300° C., at a pressure above about the atmospheric pressure and in the presence of a catalyst. The suitable catalyst consists essentially of nickel oxide and chromium sesquioxide with an inert catalytic support comprising diatomaceous earth, kaolin, and sodium carbonate. Advantageously, the catalyst is activated by treating it with hydrogen at high temperatures. Cyclohexylamine and dicyclohexylamine thus produced can be recovered by condensation.

DESCRIPTION OF PREFERRED EMBODIMENTS

In carrying out the synthesis of cyclohexylamine and dicyclohexylamine according to the present invention, the amounts of ammonia and hydrogen used may be varied within wide ranges. A molar ratio of ammonia to cyclohexanol, cyclohexanone or a mixture of both within the range of between 1 and 10 can be used. It is, however, preferred that the ratio be maintained within the range of 3 and 8. Similarly, the suitable molar ratio of hydrogen to cyclohexanol or cyclohexanone or to a mixture of both is within 1 to 10 and preferably in the neighborhood of 3 to 8. The pressure at which the reduction is carried out is between 1 and 10 and preferably is between 3 and 4 bars absolute.

Advantageously, the process is carried out continuously in the gaseous state by introducing the cyclic starting material, cyclohexanol, cyclohexanone, or a mixture of both, into a reaction vessel containing the catalyst at a rate equivalent to about 0.5 to 5 moles per hour per cubic decimeter of catalyst therein and per unit of pressure and at a temperature in the range between 100° and 300° C. A rate of 2 moles per hour, per cubic decimeter of catalyst and per unit pressure and a temperature of 180° to 200° C., however, are preferred.

The gaseous mixture emerging from the reactor is made up essentially of the excess hydrogen and ammonia and the synthesized cyclohexylamine and dicyclohexylamine. The gaseous mixture is cooled gradually by refrigeration or any other suitable means to a temperature of about 15° C. At this temperature substantially all the cyclohexylamine and dicyclohexylamine are condensed and the resultant liquid is then recovered for further treatment to separate the two products by distillation.

The gaseous mixture containing essentially all the original hydrogen and ammonia and a fraction of the non-condensed dicyclohexylamine and cyclohexylamine is advantageously reused by recycling directly to the reaction vessel at approximately the same pressure as the reaction pressure. If desired the dicyclohexylamine separated by distillation from the cyclohexylamine can also be recycled into the reaction vessel for its conversion to cyclohexylamine.

The process of the present invention is well adapted to reducing mixtures of cyclohexanol and of cyclohexanone in any proportions such as those in which these materials are produced by various techniques and processes for oxidation of cyclohexane. It is more particularly suitable to use a mixture of cyclohexanol and cyclohexanone containing cyclohexanone in amounts of the order of 10% by weight.

Under the above stated conditions the conversion yield of cyclohexanol and of cyclohexanone into cyclohexylamine and dicyclohexylamine is between 50 and 95% and customarily in the vicinity of 70 to 80%. The total yield in cyclohexaylamine and dicyclohexylamine is between 95 and 100%, based on the amounts of cyclohexanol and cyclohexanone consumed. The catalyst used for the manufacture of cyclohexylamine by the process of the invention can be particularly selective since the weight ratio of cyclohexylamine to dicyclohexylamine lies between 0.5 and 15 and more generally in the vicinity of 10 and may reach 150 by recycling the dichyclohexylamine produced.

The present invention can also use alkylamines having from 1 to 8 carbon atoms of carbon for the amination and can use as a starting material alkylcyclohexanols or alkylcyclohexanones such as methyl-, dimethyl-, ethyl-, propyl-cyclohexanol or cyclohexanone.

The suitable reduction catalyst prior to its hydrogen activation consists esentially of nickel oxide and chromium sesquioxide with the inert catalytic support of a mixture of diatomaceous earth, kaolin and sodium carbonate. The weight ratios of $Cr_2O_3$ to Ni is between 0.01 and 0.20, of kaolin to diatomaceous earth is between 0.10 and 1.00, of Ni to the total mass of the catalyst is between 0.05 and 0.50 and of sodium carbonate to the total mass is between 0.001 and 0.10. The preferred catalyst is in the form of a pellet containing a uniform mixture of the aforementioned constituents with a weight ratio of $Cr_2O_3$ to Ni being about 0.06, of kaolin to diatomaceous earth being about 0.20, of nickel to the total mass of the catalyst being about 0.15 and of sodium carbonate to the total mass of the catalyst being about 0.005.

The catalyst preferably is prepared according to the following procedure:

6.2 cubic decimeters of water were first introduced into a vessel of appropriate capacity and raised to a temperature of 80° C. There were then added, with stirring, 1.25 kilograms of pulverized anhydrous chromium acetate. After complete dissolving the acetate there was added with continued stirring and while the temperature was held in the vicinity of 60° C. 35 kilograms of hexahydrated nickel nitrate. The solution thus obtained was transferred into a kneading machine into which there were gradually introduced 37 kilograms of a diatomaceous earth (for example, a product commercially known as Baudrite) and then 18 cubic decimeters of a 28 percent by weight aqueous ammonia solution. After a complete homogenization, the paste thus obtained was dried at a temperature in the vicinity of 150° C. and then calcined for one hour to a temperature between 350° and 450° C. The solid mass thus obtained was ground and sifted to provide a fine powder.

21 kilograms of kaolin were then added to 100 kilograms of this powder in a kneading machine. After the mixture was homogeneous, there were introduced 58 cubic decimeters of a cold aqueous sodium carbonate solution containing 0.5 kilograms of pure sodium carbonate. The kneading produced a stiff but plastic paste which after passage through an extruder exhibited the form of rods 7 millimeters in diameter and 10 millimeters long. These rods were dried at a temperature in the vicinity of 150° C. and then carried to 370° C. for one hour.

The composition of these rods was as follows:

|  | Percent |
|---|---|
| NiO | 16.50 |
| $Cr_2O_3$ | 0.76 |
| $Na_2CO_3$ | 0.41 |
| Diatomaceous earth | 67.70 |
| Dehydrated kaolin | 14.63 |

The weight ratio of kaolin to diatomeaceous earth was 0.216, the weight ratio of nickel to the total mass was 0.130 and the weight ratio of $Na_2CO_3$ to the total mass was 0.004.

The catalyst thus obtained was then introduced into a catalytic oven where it was reduced by pure hydrogen according to the following schedule employing 100 cubic decimeters of pure hydrogen per cubic decimeter of the catalyst and per hour.

| Temperature, ° C.: | Duration, hours |
|---|---|
| 320° | 4 |
| 350°–370° | 15–18 |

After this reduction, the activated catalyst possessed an extremely high activity and excellent mechanical properties. It was cooled to a temperature in the vicinity of 180° to 200° C. and was then used in the synthesis of cyclohexylamine in accordance with the invention as will be illustrated in greater detail hereinbelow.

The catalytic activity of the catalyst will decline substantially after a certain period of use. The reactivation, however, is simple and resides essentially in eliminating the organic materials which contaminate it as the result of combustion in the presence of air and water vapor. After such reactivation, the catalyst is ready for re-use.

Further to illustrate the invention specific examples are described hereinbelow:

EXAMPLE I

One cubic decimeter of catalyst prepared in accordance with the procedure described hereinabove was placed into a stainless steel tube of 40 millimeters in internal diameter and 800 millimeters in length. After the reduction with pure hydrogen according to the schedule described, the temperature of the catalyst was maintained at 185° C. Thereafter, recycled hydrogen was passed over the catalyst by means of a pump of adequate capacity at a rate equivalent to 6 moles per hour and under an absolute pressure of about one bar. There were then introduced 4.4 moles or 0.075 kilogram of ammonia and 2 moles or 0.2 kilogram of a mixture of cyclohexanol and of 10% by weight cyclohexanone, the ammonia and the mixture so specified being introduced at the rate of 4.4 moles and 2 moles, respectively, per hour.

After the reaction was under way, the molar ratio of ammonia to the mixture of cyclohexanol and cyclohexanone in the presence of the catalyst was 2.2. The mole ratio between the hydrogen and the mixture of cyclohexanol and cyclohexanone was 3.0 on reaching the catalyst. The rate of feed of the mixture of cyclohexanol and cyclohexanone to the catalyst was 2 moles per hour and per cubic decimeter of catalyst.

In addition to the ammonia and water contained in the product fluids, there were obtained per hour 0.074 kilogram of cyclohexylamine, 0.094 kilogram of dicyclohexylamine and 0.018 kilogram of a mixture of cyclohexanol and cyclohexanone.

The conversion yield of the mixture of cyclohexanol and cyclohexanone was 37.2% into cyclohexylamine and 51.8% into dicyclohexylamine for a total of 89% into cyclohexylamine and dicyclohexylamine. The total cyclohexanol and cyclohexanone converted amounted to 90.8% The yields obtained were thus the following:

|  | Percent |
|---|---|
| Into cyclohexylamine | 40.9 |
| Into dicyclohexylamine | 57.1 |
| Total | 98.0 |

The quantity of cyclohexylamine produced was 0.787 times the quantity of dicyclohexylamine.

EXAMPLE II

This example was carried out with the same quantities of the same reactants, the same quantity of the same catalyst and with the same apparatus and same operating procedure as that described in Example I, except that the pressure was 2 bars absolute.

There were obtained in the product liquids, in addition to the ammonia and water, 0.104 kilograms of cyclohexylamine, 0.073 kilogram of dicyclohexylamine, and 0.0106 kilogram of mixed cyclohexanol and cyclohexanone.

The conversion yield of the mixture of cyclohexanol and of cyclohexanone was 52.4% into cyclohexylamine and 40.4% into dicyclohexylamine for a total of 92.8% into cyclohexylamine and dicyclohexylamine.

The cyclic starting material converted was 94.7%. The yields into cyclohexylamine and into dicyclohexylamine, with reference to the converted mixture of cyclohexanol and cyclohexanone were the following:

|  | Percent |
|---|---|
| Into cyclohexylamine | 55.3 |
| Into dicyclohexylamine | 42.7 |
| Total | 98 |

The quantity of cyclohexylamine was 1.425 times the quantity of dicyclohexylamine.

EXAMPLE III 7.2 cubic decimeters of the catalyst hereinabove described were introduced into a reactor in the form of a stainless steel tube 54 millimeters in interior diameter and 3.15 meters long.

After the reduction of the catalyst with pure hydrogen and maintaining the temperature at 192° C., a gaseous mixture of hydrogen and ammonia was passed over the catalyst by means of a pump of adequate capacity, the passage being at the rate of 130 moles of hydrogen and 260 moles of ammonia per hour. The pressure was in the vicinity of 2 bars absolute.

Thereupon, there were introduced at the rate of 43.2 moles or approximately 4.320 kilograms of the mixture of cyclohexanol and cyclohexanone per hour, the mixture containing 10% by weight of cyclohexanone. After this operation was established, the molar ratio of the ammonia to the mixture of cyclohexanol and cyclohexanone was 6.0 on arrival of the mixture on the catalyst. The molar ratio of the hydrogen to the mixture of cyclohexanol and cyclohexanone was 3.0 on arrival at the catalyst. the mixture of cyclohexanol and cyclohexanone was fed to the catalyst at the rate of 3 moles per hour per cubic decimeter of catalyst and per unit of pressure.

The yield per hour included, in addition to the ammonia and water contained in the product liquids, 2.642 kilograms of cyclohexylamine, 0.396 kilogram of dicyclohexylamine and 1.158 kilograms of a mixture of cyclohexanol and cyclohexanone.

The conversion yield of the mixture of cyclohexanol and cyclohexanone was 61.5% into cyclohexylamine, 10.5% into dicyclohexylamine or a total of 72.0% into cyclohexylamine plus dicyclohexylamine.

The total amount of cyclic material converted was 73.2%. The yields in cyclohexylamine and dicyclohexylamine by reference to the mixture of cyclohexanol and cyclohexanone transformed were the following:

|  | Percent |
|---|---|
| Into cyclohexylamine | 84.0 |
| Into dicyclohexylamine | 14.3 |
| Total | 98.3 |

The quantity of cyclohexylamine produced amounted to 6.67 times the quantity of dicyclohexylamine obtained.

EXAMPLE IV

With the same quantities of the same reactants and the same quantity of the same catalyst employed in the same apparatus and the same procedure as that of Example III, except that the pressure was of 3 bars absolute, there was carried out another test in which there were obtained per hour, beyond the ammonia and water in the product liquids, 2.887 kilograms of cyclohexylamine, 0.374 kilogram of dicyclohexylamine, and 0.913 kilogram of the mixture of cyclohexanol and cyclohexanone.

The conversion yields of the cyclohexanol and cyclohexanone mixture were 67.4% into cyclohexylamine, 9.6% into dicyclohexylamine, and a total of 77.0% into cyclohexylamine plus dicyclohexylamine. The total amount of cyclic material converted amounted to 78.4%.

The yields were:

|  | Percent |
|---|---|
| Into cyclohexylamine | 85.9 |
| Into dicyclohexylamine | 12.3 |
| Total | 98.2 |

The quantity of cyclohexylamine was 7.72 times the quantity of dicyclohexylamine obtained.

EXAMPLE V

There was carried out a further test identical with that of Example IV except that the pressure amounted to 4 bars absolute.

There were obtained, beyond the ammonia and water contained in the product liquids, per hour of operation, 2.923 kilograms of cyclohexylamine, 0.317 kilogram of dicyclohexylamine, and 0.959 kilogram of the mixture of cyclohexanol and of cyclohexanone.

The conversion yields of the mixture of cyclohexanol and cyclohexanone were 68.4% into cyclohexylamine, 8.2% into dicyclohexylamine or a total of 76.6% into cyclohexylamine plus dicyclohexylamine.

The total cyclic material converted amounted to 77.8%. The yields were:

|  | Percent |
|---|---|
| Into cyclohexylamine | 87.9 |
| Into dicyclohexylamine | 10.3 |
| Total | 98.2 |

The quantity of cyclohexylamine produced amounted to 9.22 times the quantity of dicyclohexylamine obtained.

EXAMPLE VI

Employing the same catalyst and the same apparatus as in Example I, there was carried out a test of recycling of the dicyclohexylamine under the following conditions:

Temperature: 190° C.
Absolute pressure: 4 bars
Hourly flow of hydrogen: 18 moles
Hourly flow of ammonia: 36 moles
Hourly feed of cyclohexanol and cyclohexanone mixture: 5.28 moles or 0.528 kilogram
Hourly feed in dicyclohexylamine: 0.359 mole or 0.0652 kilogram After the process was under way, the molar ratio between the ammonia and the mixture of cyclohexanol and cyclohexanone arriving at the catalyst was 6.82. The molar ratio of hydrogen to the mixture of cyclohexanol and cyclohexanone upon arrival at the catalyst was 3.41. The rate of feed of the mixture of cyclohexanol and cyclohexanone to the catalyst was 1.32 moles per hour, per cubic decimeter of catalyst, and per unit pressure.

In addition to the ammonia and water contained in the product liquids there were obtained, per hour, 0.345 kilogram of cyclohexylamine, 0.0676 kilogram of dicyclohexylamine, and 0.170 kilogram of the mixture of cyclohexanol and cyclohexanone.

In view of the fact that there had been recycled 0.0652 kilogram of dicyclohexylamine per hour, the quantity of dicyclohexylamine actually produced per hour was 0.0676 minus 0.0652 or 0.0024 kilogram.

The conversion yield of the mixture of cyclohexanol and cyclohexanone was 65.9% into cyclohexylamine, 0.5% into dicyclohexylamine or 66.4% into cyclohexylamine plus dicyclohexylamine.

The yields were:

| | Percent |
|---|---|
| Into cyclohexylamine | 97.3 |
| Into dicyclohexylamine | 0.7 |
| Total | 98.0 |

The selectivity of the synthesis was practically complete since the quantity of cyclohexylamine amounted to 143.75 times the quantity of dicyclohexylamine obtained.

We claim:

1. A process for the production of cyclohexylamine and dicyclohexylamine which comprises reducing in a gaseous state cyclohexanol, cyclohexanone or a mixture of both with at least stoichiometric amounts of ammonia and hydrogen at a temperature between 100° C. and 300° C., at above about atmospheric pressure and in the presence of a catalyst consisting essentially of nickel oxide and chromium sesquioxide with an inert catalytic support, said catalyst having been activated by contacting it with hydrogen, and said support consisting essentially of a mixture of diatomaceous earth, kaolin and sodium carbonate, and thereafter recovering cyclohexylamine and dicyclohexylamine therefrom.

2. A process according to claim 1 wherein the $Cr_2O_3$/Ni ratio in the catalyst is in the range between 0.01 and 0.20 by weight.

3. A process according to claim 2 wherein the catalyst is a uniform mixture of nickel oxide, chromium sesquioxide, diatomaceous earth, kaolin and sodium carbonate preformed into pellets, the weight ratio of kaolin to diatomaceous earth is between 0.10 and 1.00, the weight ratio of nickel to the total mass of the catalyst is between 0.05 and 0.50 and the weight ratio of sodium carbonate to the total mass of the catalyst is between 0.001 and 0.10.

4. A process according to claim 3 wherein the catalyst is pretreated prior to the catalytic reduction with about 100 cubic decimeters of hydrogen per cubic decimeter of the catalyst per hour at a temperature between about 320° C. and 370 C. for between about 15 to 18 hours.

5. A process according to claim 4 wherein the reduction is carried out at a pressure between 1 and 10 bars absolute and the molar ratios of ammonia to and hydrogen to the cyclohexanol, cyclohexanone or the cyclohexanol and cyclohexanone mixture are between 1 and 10.

6. A process according to claim 1 wherein reduction is carried out with a mixture of cyclohexanol and cyclohexanone in a gaseous state at a temperature in the range between 180° and 200° C. and at a pressure of between 1 and 10 bars absolute.

7. A process according to claim 6 wherein the molar ratios of ammonia to and hydrogen to the mixture of cyclohexanol and cyclohexanone are between 3 and 8.

8. A process according to claim 7 wherein the mixture contains about 10% cyclohexanone.

9. A process according to claim 1 wherein the catalytic reduction is carried out in a continuous process in introducing cyclohexanol, cyclohexanone or the mixture of both into a reaction zone containing the catalyst at a rate equivalent to about 0.5 to 5 moles per hour per cubic decimeter of catalyst and per unit of pressure.

10. A process according to claim 9 wherein the catalyst is a uniform mixture of nickel oxide, chromium sesquioxide, diatomaceous earth, kaolin and sodium carbonate preformed into pellets and has weight ratios of $Cr_2O_3$/Ni between 0.01 and 0.20, of kaolin to diatomaceous earth between 0.10 and 1.00, of nickel to the total mass of the catalyst between 0.05 and 0.5 and of sodium carbonate to the total mass of the catalyst between .001 and 0.10.

11. A process according to claim 10 wherein the product in the gaseous mixture from the reduction is recovered by condensation.

12. A process according to claim 11 wherein the non-condensed gases in the gaseous mixture from the reduction which comprises ammonia, hydrogen, dicyclohexylamine and a small amount of cyclohexylamine are recycled to the reaction zone at a pressure substantially equivalent to the pressure in said zone.

13. A process according to claim 1 wherein the reduction is carried out continuously in a reaction zone containing a reduction catalyst consisting essentially of a mixture of nickel oxide, chromium sesquioxide, diatomaceous earth, kaolin, and sodium carbonate, the weight ratios of $Cr_2O_3$/Ni being about 0.06, of kaolin to diatomaceous earth being about 0.20, of nickel to the total mass of the catalyst being about 0.15,, and of sodium carbonate to the total mass of the catalyst being about 0.005 and the catalyst in the reaction zone is pretreated with hydrogen prior to the reduction of the cyclohexanol and cyclohexanone mixture.

14. A process according to claim 13 wherein the pressure in the reaction zone is in the range between about 3 and 4 bars absolute and the temperature is in the range between 180° and 200° C.

15. A process according to claim 14 wherein the mixture of cyclohexanol and cyclohexanone contains about 10% by weight of the latter, and the rate of the mixture fed to the reaction zone is about 2 moles per hour per cubic decimeter of catalyst and per unit of pressure.

16. A process according to claim 15 wherein the amount of ammonia and the amount of hydrogen used for the reduction each is equivalent to about 3 to 8 moles per mole of the mixture.

17. A process according to claim 16 wherein the product in the gaseous mixture from the reduction is recovered by condensation and the non-condensed gas comprising ammonia, hydrogen, dicyclohexylamine, and a small amount of cyclohexylamine are recycled to the reaction zone at a pressure substantially equal to the pressure within the reaction zone.

References Cited

UNITED STATES PATENTS

| 2,187,745 | 1/1940 | Lazier | 260—585 X |
| 2,636,902 | 4/1953 | Taylor et al. | 260—563 X |

FOREIGN PATENTS 1,050,589  12/1966  Great Britain.

CHARLES B. PARKER, Primary Examiner

D. R. PHILLIPS, Assistant Examiner

U.S. Cl. X.R.

252—455